United States Patent
Jreij et al.

(10) Patent No.: US 6,178,236 B1
(45) Date of Patent: *Jan. 23, 2001

(54) METHOD AND SYSTEM FOR PROVIDING PASSWORD PROTECTION

(75) Inventors: Elie A. Jreij, Pflugerville; Tave P. Dunn, Austin, both of TX (US)

(73) Assignee: Siemens Information and Communication, Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/625,440

(22) Filed: Mar. 27, 1996

(51) Int. Cl.$^7$ .................. H04M 15/00; H04M 17/00; H04M 3/00; H04M 1/60

(52) U.S. Cl. .................. 379/188; 379/128; 379/129; 379/139; 379/145; 379/168; 379/184; 379/189; 379/194

(58) Field of Search .................. 379/67, 88, 89, 379/188, 128, 129, 131, 100, 91.01, 67.1, 93.02, 145, 168, 184, 189, 194

(56) References Cited

U.S. PATENT DOCUMENTS

| | | | |
|---|---|---|---|
| 4,601,011 | * | 7/1986 | Grynberg .................. 364/900 |
| 4,720,860 | * | 1/1988 | Weiss .................. 380/23 |
| 4,800,590 | * | 1/1989 | Vaughan .................. 380/25 |
| 4,819,267 | * | 4/1989 | Cargile et al. .................. 380/23 |
| 4,959,860 | * | 9/1990 | Watters et al. .................. 380/4 |
| 5,060,263 | * | 10/1991 | Bosen et al. .................. 380/25 |
| 5,375,243 | * | 12/1994 | Parzych et al. .................. 395/725 |
| 5,485,368 | * | 1/1996 | Ogaki et al. .................. 364/191 |
| 5,612,993 | * | 3/1997 | Hanaoka et al. .................. 379/100 |

OTHER PUBLICATIONS

"Siemens Optiset NI–1200 Family Desktop Terminal User Guide", Form No. GU30–1597–01; Part No. 98D6639, EC No. A92579, Oct. 1995, pp. 33, 34, 54 and 55.

* cited by examiner

*Primary Examiner*—Fan S. Tsang
*Assistant Examiner*—Allan Hoosain

(57) ABSTRACT

Access is granted to a portion of a computing system, such as to a configuration menu of a telephone system. In order to grant access, a password is received from a user. A variable password is also calculated. The variable password varies with time. For example, the variable password varies with a current date and with a time of day stored by the computing system. The password received from the user is compared with the calculated variable password. When the password received from the user is equal to the calculated variable password, access is granted.

11 Claims, 5 Drawing Sheets

METHOD AND SYSTEM FOR PROVIDING PASSWORD PROTECTION

BACKGROUND

The present invention concerns the provision of security to computing devices and pertains particularly to providing password protection which utilizes a variable master password.

In many computing devices it is desirable to prohibit access by utilizing passwords. For example, in some phone systems available from Siemens Rolm Communications, Inc., having a business address of 2205 Grand Avenue Parkway, Austin Tex. 78728, configuration data is protected through a customer-defined password mechanism. However, a customer may forget the chosen password and thus not be able to change the configuration of the phone or access the functions protected by the password.

Various schemes have been considered to allow a customer to recover from the loss of a password. In one scheme, the customer calls a technical support number. The technical support representative provides the user with a master password which is effective for the phone model. The customer then uses the master password to change the configuration of the phone or access the functions protected by the password. The master password is also used to program a new password which the customer will remember.

One problem with the use of a master password which is effective across a phone model is that once the master password becomes known to users, this renders password protection compromised and thus ineffective.

Alternatively, each individual phone could have its own master password. When the customer calls a technical support number after losing his or her password, the technical support representative asks for the serial number of the telephone. The service representative then consults a list of all serial numbers which includes corresponding master passwords.

One problem with the use of a personalized master password for each individual phone is the extra cost required to program each phone with its own personalized master password. In addition, if any portion of the list of personalized master passwords is lost, then there would be no way to unlock the pertinent phones.

SUMMARY OF THE INVENTION

In accordance with the preferred embodiment of the present invention, access is granted to a portion of a computing system. For example, access is granted to a configuration menu of a telephone system. In order to grant access, a password is received from a user. A variable password is also calculated. The variable password varies with time. For example, the variable password varies with a current date and with a time of day stored and updated by the computing system. The password received from the user is compared with the calculated variable password. When the password received from the user is equal to the calculated variable password, access is granted. In addition, in the preferred embodiment, when the password received from the user is equal to a user-defined password previously entered into the computing system, access is also granted.

The use of a variable password as a master password allows a user to recover from the loss of a password. For example, each telephone system of a particular telephone system model can utilize the same variable password. Then if the user forgets the user-defined password, the user can call a technical support number. The technical support representative obtains from the user the time (e.g., date and time of day) displayed by the telephone system. Using this information and the relevant algorithm, the technical support representative calculates the current valve for the variable master password for the time displayed by the telephone system. The technical support representative then provides the current value for the variable master password for the time (e.g., date and time of day) displayed by the telephone system to the user. The user uses this variable master password to access the configuration menu. Once inside the configuration menu the user can either remove the password or program a new password.

The use of a variable master password allows for protection against the loss by the user of a user-defined password. Because the variable master password uses the same algorithm to be calculated, there is no extra cost required to program each telephone. Also there is no list of personalized master passwords which can be lost. In addition, a user who knows a variable master password cannot use the variable master password on other phones, once the current value for the variable master password changes. This insures the continuing integrity of the password protection.

DESCRIPTION OF THE PREFERRED EMBODIMENTS

Figure 1:
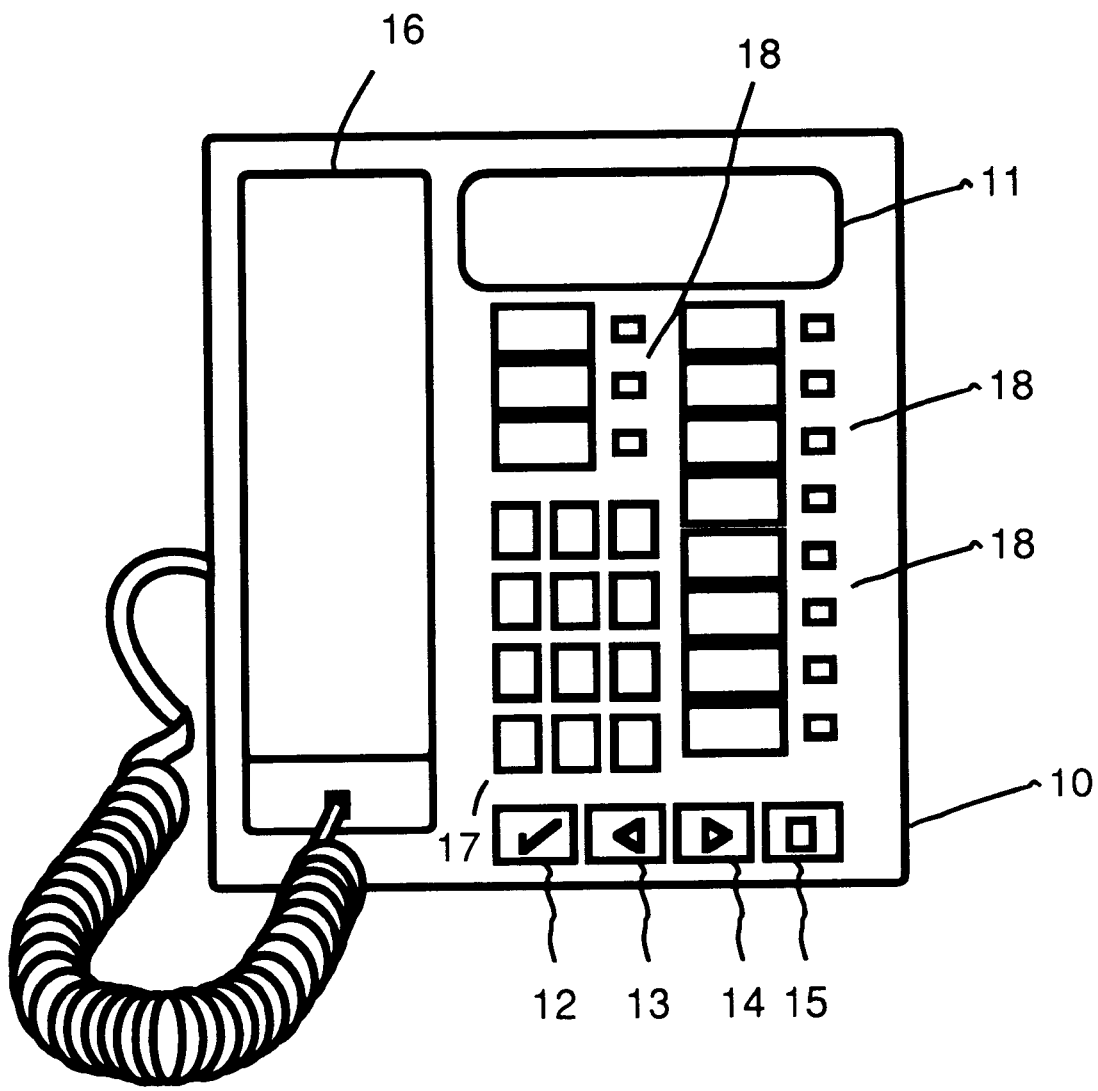
FIG. 1 shows a telephone system with a display.

FIG. 1 shows a telephone system 10. Telephone system 10 includes a handset 16, a display 11, and a dialpad 17. Telephone system 10 also includes a program key 12, a program key 13, a program key 14 and a program key 15 which can be used in the course of accessing programming features of telephone system 10. Additional feature keys 18 also are included within telephone system 10.

Figure 2:
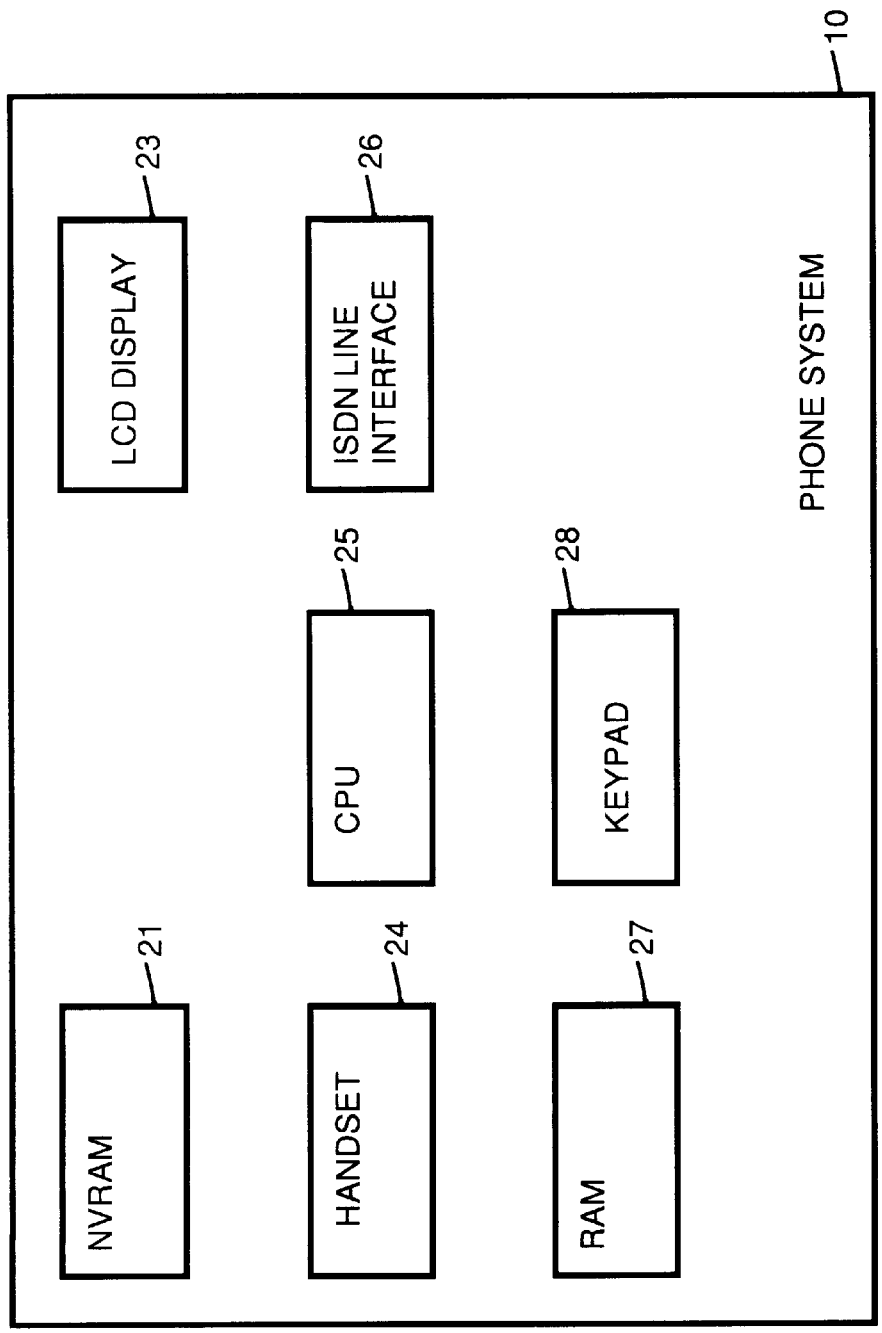
FIG. 2 shows logic blocks of the telephone system shown in FIG. 1.

FIG. 2 shows a block diagram of internal logic within telephone system 10. As shown in FIG. 2, telephone system 10 includes a central processing unit (CPU) 25, read only memory (ROM) 22, random access memory (RAM) 27, non-volatile random access memory (NVRAM) 21, handset logic block 24, liquid crystal display (LCD) logic 23, keypad logic 28, and integrated services digital network (ISDN) line interface logic 26.

NVRAM 21 stores configuration data for telephone system 10. NVRAM 21 is also available for storage of programs; however, this is done in an area of NVRAM 21 separate from the configuration data. LCD display logic 23 is used to drive LCD display 11. LCD display 11 is used to display telephone information and to echo user input. Keypad logic 28 is used to receive input from dialpad 17 and program keys 12, 13, 14 and 15. ISDN line interface logic 26 provides an interface to the public ISDN network. CPU 25 is a microprocessor which provides processing power for telephone system 10.

Figure 3:
FIG. 3 and FIG. 4 show various information displayed by the telephone system shown in FIG. 1 when accessing a configuration menu.

Telephone system 10 provides configuration capability which is protected by a password. The configuration menu is accessible when telephone system 10 is not in use by depressing program key 14 or program key 13 until a "Configure phone?" display appears in LCD display 11. The "Configure phone?" display is shown in FIG. 3. Once the "Configure phone?" display appears in LCD display 11, the configuration feature is selected by depressing program key 12.

Figure 4:

If a user has previously defined a password, selecting the configuration feature by depressing program key 12 when the "Configure phone?" display appears in LCD display 11 results in a message which prompts for a password appearing in LCD display 11, as shown in FIG. 4. When this message appears, a user must enter the password from dialpad 17 before accessing the phone configuration menu.

The password is entered by the user depressing keys on dialpad 17. For each digit or symbol entered, an asterisk (*) is displayed. If a mistake is made, program key 13 can be depressed to backspace. When a user finishes typing the password, the password is entered by pressing program key 12.

Figure 5:
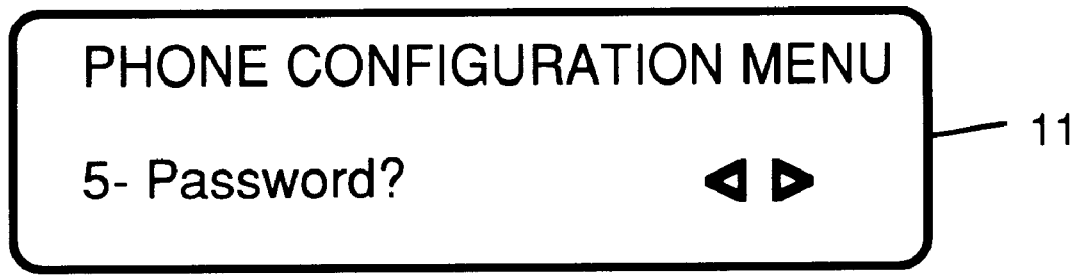
FIG. 5 and FIG. 6 show various information displayed by the telephone system shown in FIG. 1 when entering a new password.
Figure 6:
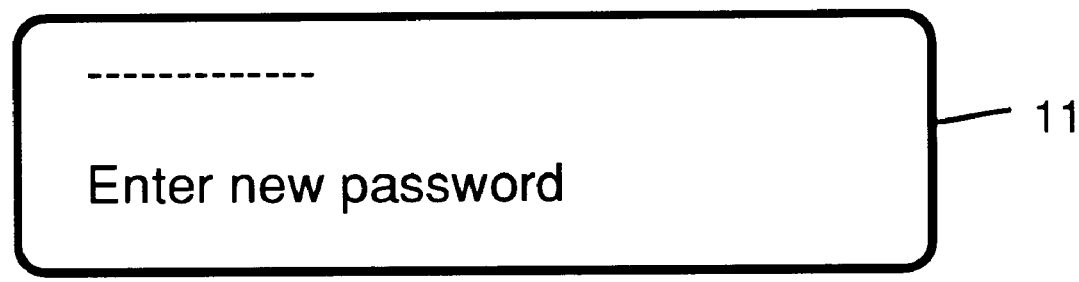

Once in the configuration menu, a password may be added or changed by pressing program key 14 or program key 13 until "Password?" appears on the display, as shown in FIG. 5. The "password" feature is then selected by pressing program key 12. Once program key 12 is pressed the user is prompted to type in a new password by the display shown in FIG. 6. In the preferred embodiment, a password is 1 to 7 digits. '*' and '#' may be included as part of the password. To delete the password, the user presses program key 13 until only blanks show on display 11. To save the new password, the user presses program key 12.

In the preferred embodiment of the present invention, telephone system 10 prompts for the new password for verification before leaving the password menu.

If the user forgets the chosen password, the user is not granted access to change the configuration of telephone system 10 or access of the functions protected by the password. In the preferred embodiment of the present invention, this is remedied by the use of a variable master password. The variable master password is dependent, for example on the time (e.g., date and time of day) accessed.

Figure 7:
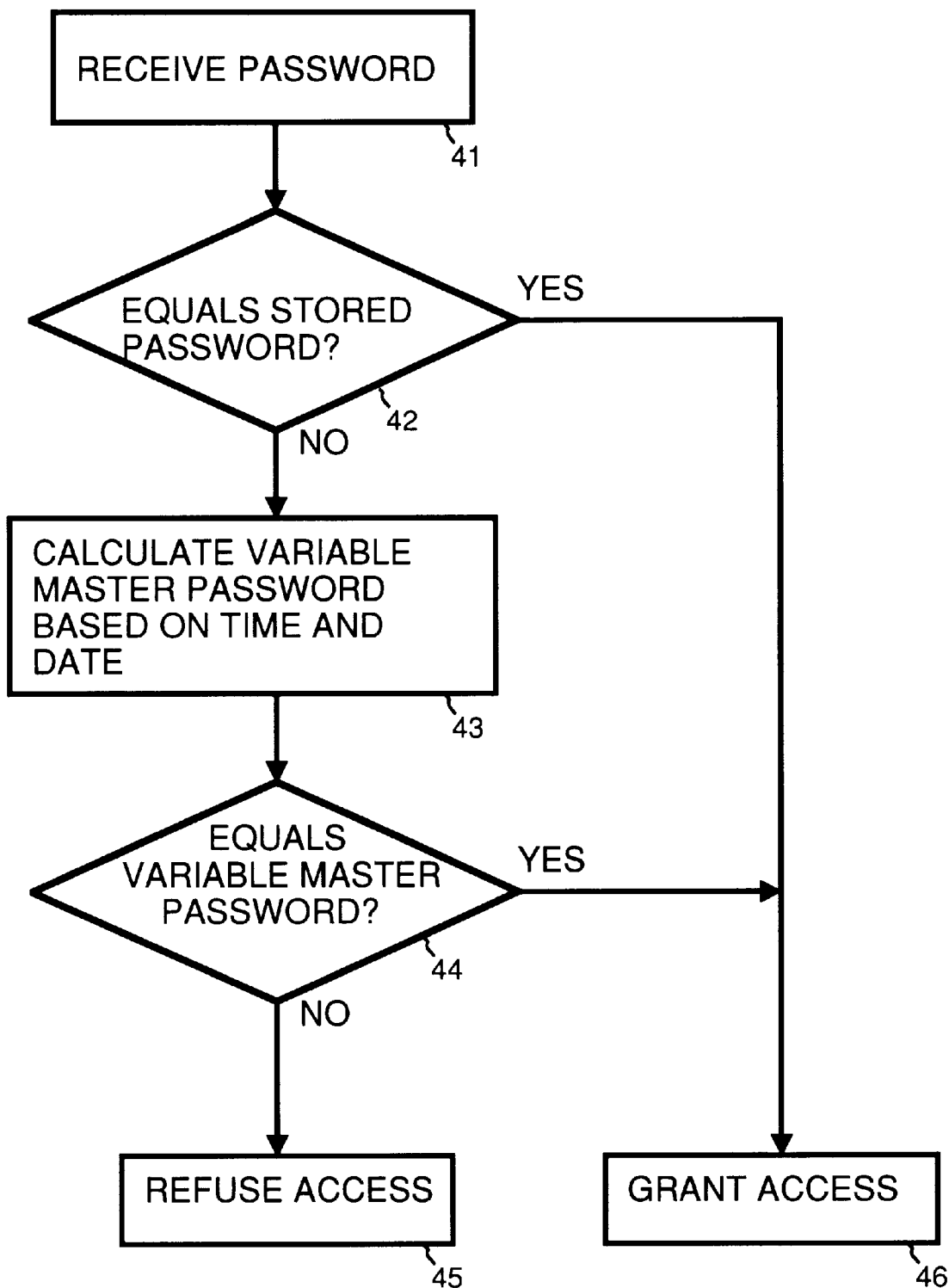
FIG. 7 is a flowchart which illustrates operation of the password feature of the telephone system shown in FIG. 1 in accordance with a preferred embodiment of the present invention.

FIG. 7 is a flowchart which illustrates operation of the password feature of telephone system 10, including use of the variable master password. In a step 41, telephone system 10 receives the password from the user. When the user finishes typing the password, the user presses program key 12.

In a step 42, telephone system 10 compares the entered password with the user-defined password previously stored by the user. If the entered password is the same as the user defined password previously stored by the user, in a step 46, the user is granted access to the configuration menu.

In step 42, if the entered password is not the same as the user-defined password previously stored by the user, in a step 43, the variable master password is calculated based on the time (i.e., current date and/or time of day) stored by telephone system 10. The algorithm used to calculate a variable master password may be any mathematical algorithm which uses as a variable one or more of the following time information: year, month, day, hour, minute, second.

For example, typically, the algorithm used to calculate variable master password is a mathematical algorithm which uses as a variable the current year, month, day and hour. This means that each variable master password is good for up to one hour. For example, the algorithm shown in Table 1 below may be used to calculate the variable master password:

Table 1

(Year+2666) (month+12) (day of month+31) (hour of day+24)

The least significant seven digits of the result of the algorithm calculated in Table 1 above are used as the variable master password. Alternatively, any other method of calculating the variable master password may be utilized so along as the method of calculating the variable master password uses as a variable one or more of the following time information: year, month, day, hour, minute, second.

In a step 44, telephone system 10 compares the entered password with the variable master password calculated in step 43. If the entered password is the same as the variable master password calculated in step 43, in step 46, the user is granted access to the configuration menu.

In step 44, if the entered password is not the same as the variable master password calculated in step 43, in a step 45, the user is denied access to the configuration menu and prompted to enter another password.

In alternative embodiments of the present invention, one or more passwords used for factory diagnostics may be added. In this case the flowchart shown in FIG. 7 can be modified to check for the password(s) used for factory diagnostics. For example, for the flowchart shown in FIG. 7, the password used for factory diagnostics could be checked first.

The use of a variable master password allows the user to recover from the loss of a password. For example, each telephone system of a particular telephone system model can utilize a same variable password. Then when the user forgets the user-defined password, the user can call a technical support number. The technical support representative obtains from the user the time (i.e., date and time of day) displayed by the telephone system. Using this information and the relevant algorithm, the technical support representative calculates the current value for the variable master password for the time displayed by the telephone system. The technical support representative then provides the current value for the variable master password for the time (i.e., date and time of day) displayed by the telephone system to the user. The user uses this variable master password to access the configuration menu. Once inside the configuration menu the user can either remove the password or program a new password.

The use of a variable master password allows for protection against the loss by the user of a user-defined password. Because the variable master password uses the same algorithm to be calculated, there is no extra cost required to program each telephone. Also there is no list of personalized master passwords which can be lost.

What is claimed is:

1. In a telephone system, a method for granting access to a configuration menu comprising the steps of:

(a) receiving a password from a user;

(b) if the password received in step (a) is equal to a user-defined password previously entered into the telephone system, granting access to the configuration menu; else (c) calculating a password that depends on the current time;

(d) comparing the password received in step (a) with the password calculated in step (c); and, (e) when the password received in step (a) is equal to the password calculated in step (c), grating access to the configuration menu.

2. A method as in claim 1 wherein in step (c) the calculated password depends on the current date but not on the time of day.

3. In a computing system, a method for granting access comprising the steps of:

(a) receiving a password from a user;

(b) calculating a password that depends on the current time;

(c) comparing the password received in step (a) with the password calculated in step (b); and, (d) when the password received in step (a) is equal to the password calculatd in step (b), granting access.

4. A method as in claim 3 additionally comprising the following step:

(e) when the password received in step (a) is equal to a user-defined password previousy entered into the computing system, granting access.

5. A method as in claim 3 wherein in step (b) the calculated password depends on the current date but not the time of day.

6. A method as in claim 3 wherein the computing system is within a telephone system.

7. A computing system comprising:

a keypad through which a user enters a password;

calculating means for calculating a password that depends on the current time;

comparing means for comparing the password entered by the user through the keypad with the calculated password; and, access granting means for granting access to a portion of the computing system when the password entered by the user through the keypad is equal to the calculated password.

8. A computing system as in claim 7 wherein the access granting means additionally is for granting access to a portion of the computing system when the password entered by the user through the keypad is equal to a user-defined password previously entered into the computing system.

9. A computing system as in claim 7 wherein the calculating means calculates the password so that the calculated password depends on the current date but not on the time of day.

10. A computing system as in claim 7 wherein the computing system is within a telephone system.

11. A computing system as in claim 10 wherein the portion of the computing system to which the access granting grants access when the password entered by the user through the keypad is equal to the calculated password is a configuration menu for the telephone system.

* * * * *